United States Patent [19]
Imanaka et al.

[11] Patent Number: 4,886,320
[45] Date of Patent: Dec. 12, 1989

[54] VITAL PRESSURE REGULATING SYSTEM FOR RAILROAD CARS

[75] Inventors: Asaji Imanaka; Kazutaka Nagata, both of Kobe, Japan

[73] Assignee: Nippon Air Brake Co., Ltd., Kobe, Japan

[21] Appl. No.: 231,931

[22] Filed: Aug. 15, 1988

[30] Foreign Application Priority Data

Aug. 31, 1987 [JP] Japan .......................... 62-133638[U]

[51] Int. Cl.$^4$ ........................ B60T 13/18; B60T 13/70
[52] U.S. Cl. ...................................... 303/11; 303/15; 303/20; 303/DIG. 3; 318/481
[58] Field of Search ........................ 303/10, 11, 15, 20, 303/57, 59, 60, DIG. 3; 188/151 R, 153 R, 3 R; 105/61; 340/60, 626; 318/449, 450, 481, 645

[56] References Cited

U.S. PATENT DOCUMENTS

| | | | |
|---|---|---|---|
| 2,536,025 | 1/1951 | Blackburn | 318/645 |
| 4,518,903 | 5/1985 | Matsumoto et al. | 303/20 |
| 4,524,312 | 6/1985 | Matsumoto et al. | 303/20 |

FOREIGN PATENT DOCUMENTS

| | | | |
|---|---|---|---|
| 0268884 | 11/1986 | Japan . | |
| 2182103 | 5/1987 | United Kingdom | 303/10 |

Primary Examiner—Andres Kashnikow
Assistant Examiner—Timothy Newholm
Attorney, Agent, or Firm—J. B. Sotak

[57] ABSTRACT

A vital pressure regulating system is constructed using an alternating current system, and the absolute value of an output signal is inversely proportional to the air pressure in the main air reservoir and therefore if some critical circuit component fails, the output of a comparator circuit becomes a direct current signal in the same way as the case in which the air pressure in the main air reservoir is higher than the predetermined upper limit value so that the switch shuts off the air compressor to achieve fail-safe operation.

1 Claim, 2 Drawing Sheets

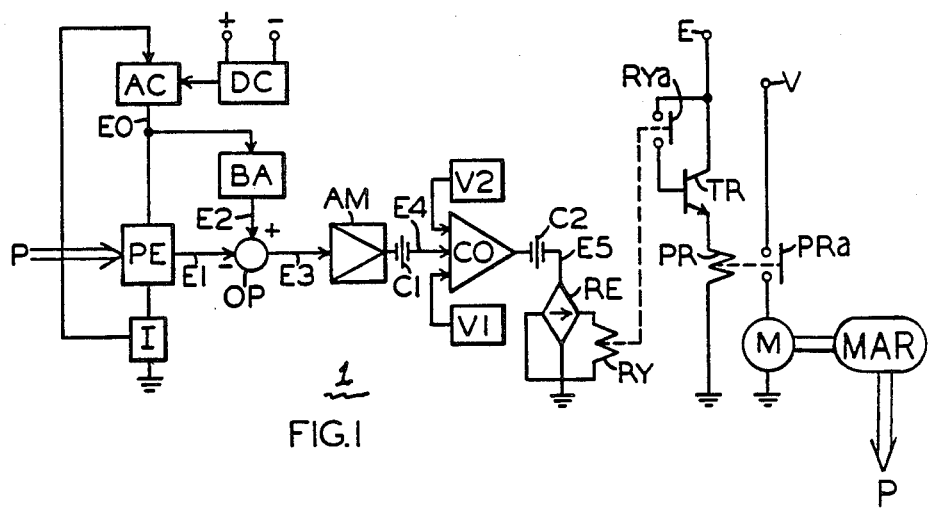
FIG.1
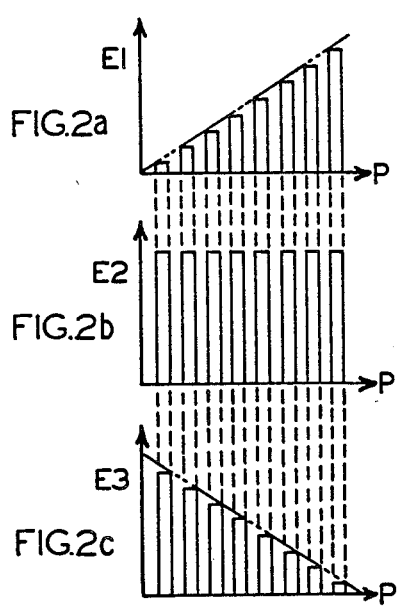
FIG.2a
FIG.2b
FIG.2c
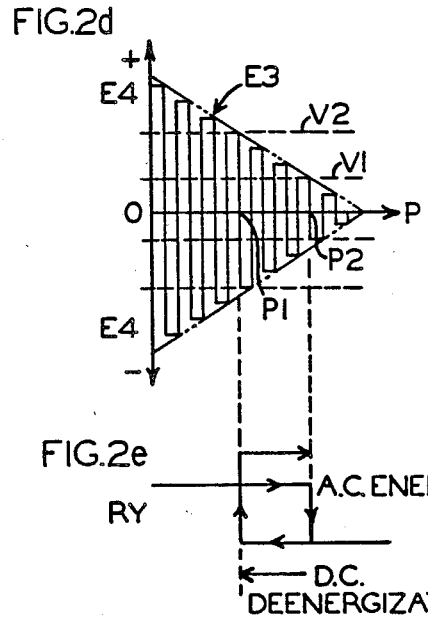
FIG.2d
FIG.2e

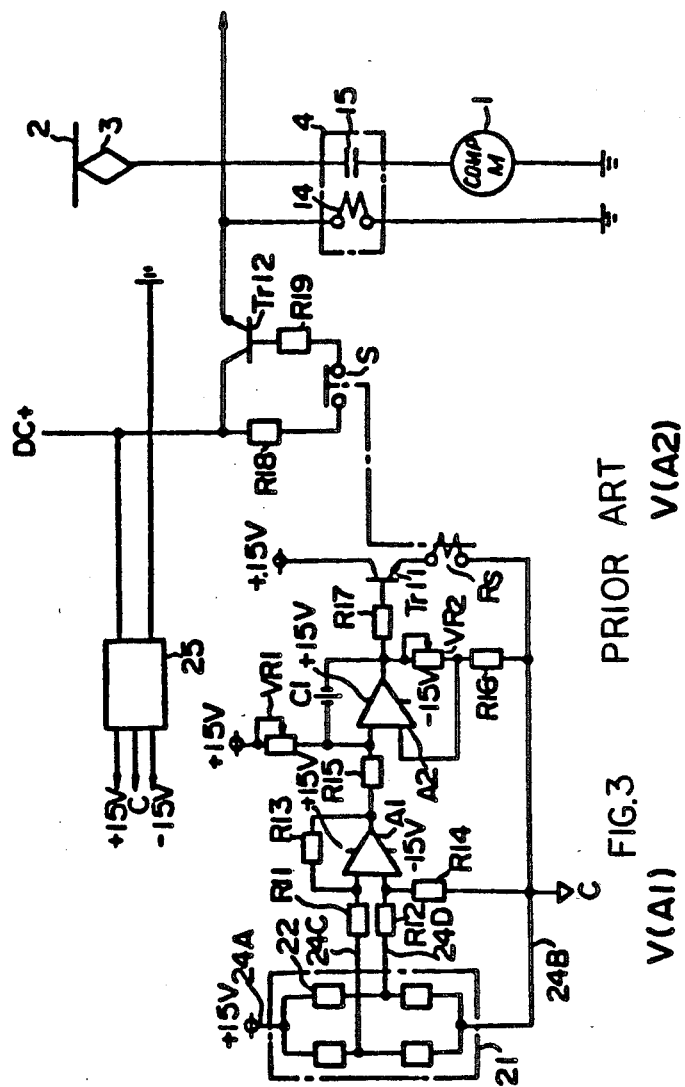
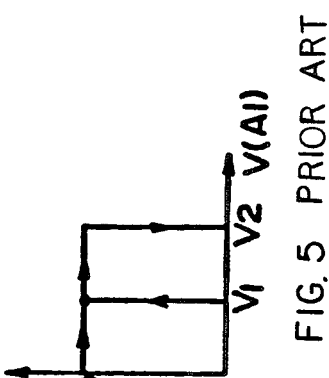
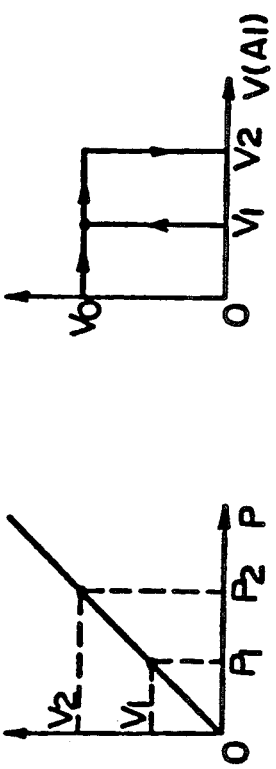
FIG.3
FIG.4 PRIOR ART
FIG.5 PRIOR ART

VITAL PRESSURE REGULATING SYSTEM FOR RAILROAD CARS

FIELD OF THE INVENTION

This invention relates to a vital pressure regulating system which is adapted to be used in railway vehicles and which controls the air pressure in the main air reservoir which functions as the air source for the air brake system or for automatic door opening and closing system.

BACKGROUND OF THE INVENTION

In the prior art, one type of a pressure regulation system is shown and disclosed in Japanese Pat. No. 61-268884 which is incorporated by reference. The following is a detailed explanation of structure and operation and using the same reference as noted in the specification and drawings of the above Japanese patent.

Reference is now made to FIGS. 3, 4 and 5 of the present invention which are substantially the same as FIGS. 1, 3 and 4 of the above-noted Japanese patent.

This embodiment of the prior art brake regulating system includes a pressure sensor such as deformation strain gage 21 which receives the air pressure P from the main air reservoir. The sensor converts force of the air pressure P into a corresponding output voltage signal.

As noted, a differential amplifier A1 amplifies the output voltage signal. A comparator A2 which has a hysteresis capability compares the output voltage signal V of the amplifier A1 with a pair of the standard voltage values V1 and V2. A suitable switch such as an output relay RS etc. controls the operation of the air compressor 1 in accordance with the output voltage of the comparator A2.

It will be appreciated that the above mentioned standard voltage value V1 is equivalent to the predetermined lower limit pressure value P1 of the main air reservoir pressure P. Similarly the standard voltage value V2 is equivalent to the predetermined upper limit pressure value P2. It will be understood that P2>P1 so that V2>V1.

During the initial stages of pressurization or charging, the compressed air is supplied to the main air reservoir which is initially at atmospheric pressure. Thus, the output voltage V of the amplifier A1 is less than the standard voltage value V1 so that the output relay RS is energized and the main supply contactor 4 is switched ON so that the air compressor 1 begins to operate.

The air pressure P supplied to the main air reservoir rises because of the operation of this air compressor 1. When air pressure becomes higher than the predetermined upper limit pressure value P2, the output voltage V of the amplifier A1 also becomes higher than the standard voltage value V2 so that the output relay RS is deenergized and the main contactor 4 switches OFF. Thus the air compressor 1 shuts off.

Now when the compressed air is used or consumed by the operation of the air brake system or the like, the air pressure P in the main air reservoir obviously decreases and eventually becomes less than the predetermined lower limit pressure value P1. Thus, the output voltage V of the amplifier A1 becomes less than the standard voltage value V1 so that the output relay RS is again energized by the turning on of the main contactor 4. Accordingly, the air compressor again begins to operate.

Thus, the air pressure P in the main air reservoir is effectively controlled to a specified pressure range, in particular between the predetermined lower limit pressure value P1 and the predetermined upper limit pressure value P2.

However, in pressure regulation systems of the prior art types for railway vehicles, the electric control circuitry normally utilize direct current circuits so that a failure occurring in a given electrical component, for example, the comparator A2 would go undetected. Further, if a failure switches the power transistor Tr 12 to an ON condition, the air compressor would continue to run in spite of the fact that the air pressure P has already reached the predetermined upper limit pressure value P2. The resulting problems may result in the burnout of the drive motor, the temperature of the discharging air increases to an intolerable level, and the ability of removing the moisture from the discharged air dramatically decreases.

The fundamental cause of this problem is that the failure of the direct current electric control circuit is not easily detected since the normal ON or OFF conditions are not discernible from an unsafe mode.

OBJECTS AND SUMMARY OF THE INVENTION

Therefore, it is an object of this invention to solve the above-mentioned problem by constructing a vital pressure regulation system for railway vehicles.

Pressure regulation system for railway vehicles in which the air pressure in the main air reservoir is monitored so that the air compressor is operated when the air pressure decreases and falls below a predetermined lower limit value, and so that the air compressor is shut off when the air pressure increases and exceeds a predetermined upper limit value comprising, a pressure sensor for sensing the air pressure in the main air reservoir and for converting the air pressure into a first alternating current signal wherein the absolute value of the first alternating current signal becomes progressively greater in proportion to the air pressure. A bias signal generator for producing a second constant alternating current signal in phase with the first alternating current signal, a summing operating circuit for subtracting the first alternating current signal from the second constant alternating current signal and for producing a third alternating current signal wherein the absolute value of the third alternating current signal becomes progressively smaller and is inversely proportional to the air pressure, a comparator receiving the third alternating current signal which has a first predetermined value which is equivalent to the predetermined upper limit value of the air pressure, and has a second predetermined value which is equivalent to the predetermined lower limit value of the air pressure. The comparator producing a fourth alternating current signal when the absolute value of the third signal increases and becomes progressively higher than the absolute value of the second predetermined value and produces a direct current signal when the absolute value of the third signal decreases and becomes progressively lower than the absolute value of the first predetermined value, and a switch which causes the air compressor to operate when the comparator produces the alternating current signal, and which shuts off the air compressor when the comparator produces a direct current signal.

As a result of this invention, when the absolute value of the third signal consisting of the alternating current electric signal increases with simultaneous decrease in the air pressure in the main air reservoir, and when the air pressure becomes lower than the predetermined lower limit value, the absolute value of the third signal becomes larger than the absolute value of the second predetermined value, and the output of the comparator becomes an alternating current electric signal, and the switch initiates operation of the air compressor.

Since the air compressor is running, the air pressure in the original air reservoir increases, and simultaneously, the third signal decreases, and when the air pressure becomes higher than the predetermined upper limit value, the absolute value of the third signal becomes lower than the absolute value of the predetermined first value, and the output of the comparator becomes a direct current electric signal, and the switch shuts off the air compressor.

In addition, in this invention, the pressure regulating system is constructed using an alternating current system, and so that the absolute value of the third signal is inversely proportional to the air pressure in the main air reservoir and therefore if some critical circuit component fails, the output of the comparator becomes a direct current electric signal in the same way as the case in which the air pressure in the main air reservoir is higher than the predetermined upper limit value, and the switch shuts off the air compressor to achieve a fail-safe protection system.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 1 is a schematic circuit diagram of a vital type of a pressure regulating system for railway vehicles in accordance with the present invention.

FIG. 2a, 2b, 2c, 2d and 2e are characteristic curves ofthe operation of the pressure regulation system of FIG. 1.

FIG. 3 is a schematic circuit diagram of a prior art type of brake regulating system for railway vehicles.

FIGS. 4 and 5 are the pressure and voltage characteristic curves of the operation of the brake regulating system of FIG. 3.

DETAILED DESCRIPTION OF THE INVENTION

Referring now to the drawings, and in particular to FIG. 1, there is shown a fail-safe pressure regulation system generally characterized by numeral 1 for railway vehicles or the like. As shown in FIG. 1, air compressor M supplies and conveys the compressed air to the main air reservoir which is characterized by letters or symbol MAR. The air compressor M is electrically connected to the main power source V via the contact point or switch PRa of the main relay contactor PR. The main contactor PR is electrically connected to the control power source E via the power transistor TR which receives commands from the pressure regulation system which will be described presently.

The pressure regulation system consists primarily of a suitable pressure sensor PE, a bias signal generator BA, a summing operator OP, a comparator CO, a rectifier RE, and an output relay RY. The rectifier RE and the output relay RY form a switching circuit for opening and closing contact point or switch RYa.

The pressure sensor PE which may be a suitable deformable strain gauge or the like receives a standard alternating current electric signal EO from a chopper power source, such as a square-wave oscillator AC. At the same time, the air pressure P from the main air reservoir is supplied to the input of the deformable strain guage sensor PE which converts it into a corresponding alternating current electric signal. The absolute value of alternating current signal proportional progressively larger in response to the air pressure P. Thus, the output of sensor, namely the first signal El as shown in FIG. 2a is fed to the one input (−) of summing operator OP.

The bias signal oscillator BA also receives the alternaing current electric signal EO and produces a constant alternating second output signal E2 as shown in FIG. 2b which is also fed to the other input (+) of the summing operator OP. The summing circuit or operator OP subtracts the first signal E1 from the second signal E2 and produces a third alternating current electrical signal E3 as shown in FIG. 2c. It will be seen the absolute value of signal E3 becomes progressively smaller since it is inversely proportional to the air pressure P. This signal E3 is transmitted to the amplifier AM. The output of amplifier AM is connected to the condenser C1. The amplified alternating current of the third signal E3 is converted to the fourth signal E4 as shown in FIG. 2d. The fourth signal E4 is fed to the input of the comparator circuit CO.

The amplifier AM is for regulating the control level, and for purposes of explanation. It will be noted the absolute value of the fourth signal E4 on the positive side and the negative side as shown in FIG. 2d is designed to be the same as the positive side of the third signal E3 as shown in FIG. 2c. That is, the positive (+) and negative (−) envelope of signal E4 corresponds to the signal E3.

The comparator circuit CO has a hysteresis characteristic so that it compares the fourth signal E4, namely, the third positive signal E3 with a first predetermined voltage value V1 and a second predetermined voltage value V2. The comparator CO produces an alternating current electrical output signal when the third signal E3 increases and becomes larger than the second predetermined value V2. Conversely, the comparator produces a direct current electrical output signal when the third signal E3 decreases and becomes less than the first predetermined value V1. Thus, the first predetermined voltage value V1 is proportional or equivalent to the predetermined upper limit pressure value P2 of the air pressure P in the main air reservoir. In the same manner, the second predetermined value V2 is equivalent or proportional to the predetermined lower limit value Pl of the air pressure P, and according the voltage V2 is greater than (>) voltage V1.

In addition, these comparisons are made on the positive side of the fourth signal E4. It will be appreciated that the comparison can also be made on the negative side of the fourth signal E4 with the result that both of the predetermined voltage values V1 and V2 will be negative. It will be seen that an a.c. passing capacitor or condenser C2 is connected to the output of the comparator CO.

The electromagnetic output relay RY which forms the switching device is connected to the output terminals of the bridge rectifier RE. The input of the rectifier RE is connected to the output of comparator CO. Accordingly the output relay RY is energized when the output E5 of the comparator CO is an alternating current signal. Conversely, the output relay RY is deenergized when the output E5 of the comparator CO is a direct current signal (however, it includes 0 volts).

The energization and deenergization states of the output relay RY are graphically indicated in FIG. 2e. It will be seen that the contact point or jump contact RYa of the output relay RY is connected to the base electrode of the NPN power transistor TR.

The block I in FIG. 1 is the current detection circuit which detects an abnormal current due to an open in the circuit or a short circuit in the pressure sensor PE. Both an open and short circuit stops the oscillating condition of the oscillator AC. The block DC in FIG. 1 is the d.c. power supply which forms the electric voltage source in each electrical component of the system The main air reservoir is initially at atmospheric pressure. Now if a suitable control switch (not shown) is activated or closed and with the air pressure P is a zero (0), level the fourth signal E4 namely, the third signal E3 is greater than the second standard value V2. The output E5 of the comparator CO is an alternating current signal. The a.c. signal is rectified by the rectifier RE so that the output relay RY is energized. Thus, the contact point RYa is closed, and the power transistor TR is switched ON. The turning ON of transistor TR causes the relay contractor PR to be energized so that its contact point PRa is closed. Accordingly the air compressor M begins to operate and causes pressure to begin building up in the main air reservoir.

That is, since the air compressor has started to operate, the air pressure P in the air reservoir rises. Simultaneously, the first signal E1 becomes increasingly larger and the absolute value of the third signal E3 and the fourth signal E4 becomes decreasingly smaller. Now when the air pressure P reaches the predetermined upper limit pressure value P2, the fourth signal E4 and the third signal E3 decrease toward the first predetermined value V1. Thus the output E5 of the comparator CO becomes a direct current electric signal, and the output control relay PR is deenergized and its contact point RYa opens. Therefore, the power transistor TR turns OFF, and the main contactor relay PR is deenergized and its contact point PRa is opened. Thus, the air compressor M is shut off.

Now when the compressed air in the air reservoir is consumed and its air pressure P decreases because of the operation of the air brake system or the like, the first signal El decreases, and at the same time, the absolute value of the third signal E3 and the fourth signal E4 become increasingly larger. When the air pressure P decreases to the predetermined lower limit value P1, the third signal E3 reaches the second predetermined voltage value V2 and the output E5 of the comparator CO becomes an alternating current electric signal, the output relay RY is energized and its contact point RYa is closed.

Therefore, the power transistor TR turns ON, and the control relay contactor PR is energized. Thus, the contact point PRa is closed so that the air compressor M again goes back into operation.

Thus, the air pressure P in the main air reservoir is controlled so that it remains between the predetermined upper limit pressure value P2 and the predetermined lower limit pressure value P1.

In addition, if some critical circuit component, for example the comparator, should fail, the output E5 reverts to a direct current electrical signal so that as in the case when the air pressure P reaches the predetermined upper limit value P2, the air compressor M shuts off and fail-safe protection is ensured.

The following is a nomenclature list of components or elements shown and disclosed in the drawings and specification of the subject invention:

M Air compressor
P Air pressure in the main air reservoir
P1 Predetermined lower limit pressure value
P2 Predetermined upper limit pressure value
PE Pressure sensor
BA Bias signal generator
OP Summing operator
CO Comparator circuit
AM Amplifier circuit
E1 First signal
RE Rectifier
E2 Second signal
RY Output relay switch
E3 Third signal
V1 First predetermined voltage value
V2 Second predetermined voltage value
RY Output relay
E4 Fourth signal
E5 Output signal
PR Control relay
DC d.c. power supply
I Current detection circuit Thus, the present invention has been described in such full, clear, concise and exact terms as to enable any person skilled in the art to which it pertains to make and use the same, and having set forth the best mode contemplated of carrying out this invention. We state that the subject matter, which we regard as being our invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

We claim:

1. A pressure regulating system for railway vehicles in which the air pressure in a main air reservoir is monitored so that an air compressor is operated when the air pressure decreases and falls below a predetermined lower limit value, and so that the air compressor is shut off when the air pressure increases and exceeds a predetermined upper limit value comprising, a pressure sensor means for sensing the air pressure in the main air reservoir and for converting the air pressure into a first alternating current signal wherein the absolute value of the alternating current signal becomes progressively greater in proportion to the air pressure, a bias signal generator means for producing a second constant alternating current signal in phase with the first alternating current signal, a summing operating circuit means for subtracting the first alternating current signal from the second constant alternating current signal and for producing a third alternating current signal wherein the absolute value of the third alternating current signal becomes progressively smaller and is inversely proportional to the air pressure, a comparator means receiving the third alternating current signal which has a first predetermined value which is equivalent to the predetermined upper limit value of the air pressure and has a second predetermined value which is equivalent to the predetermined lower limit value of the air pressure, the comparator means producing a fourth alternating current signal when the absolute value of the third signal increases and becomes progressively higher than the absolute value of the second predetermined value and produces a direct current signal when the absolute value of the third signal decreases and becomes progressively lower than the absolute value of the first predetermined value, and a switch which causes the air compressor to operate when the comparator means produces the alternating current signal, and which shuts off the air compressor when the comparator means produces a direct current signal.

* * * * *